United States Patent [19]

Ohtsuka et al.

[11] Patent Number: 4,485,133
[45] Date of Patent: Nov. 27, 1984

[54] OXYGEN ABSORBENT PACKAGING

[75] Inventors: Sadao Ohtsuka, Chiba; Toshio Komatsu, Tokyo; Yukio Kondoh, Saitama; Hideyuki Takahashi, Tokyo, all of Japan

[73] Assignee: Mitsubishi Gas Chemical Company, Inc., Tokyo, Japan

[21] Appl. No.: 377,154

[22] Filed: May 11, 1982

[51] Int. Cl.³ .............................................. B32B 3/10
[52] U.S. Cl. .................................... 428/35; 426/106; 426/124; 426/316; 428/137
[58] Field of Search .............. 426/106, 124, 316; 428/35, 137, 138

[56] References Cited

U.S. PATENT DOCUMENTS

| 4,104,192 | 8/1978 | Yoshikawa et al. | 426/544 |
| 4,113,652 | 9/1978 | Yoshikawa et al. | 426/124 |
| 4,127,503 | 11/1978 | Yoshikawa et al. | 252/440 |
| 4,166,807 | 9/1979 | Komatsu et al. | 426/124 |
| 4,192,773 | 3/1980 | Yoshikawa et al. | 426/124 |
| 4,287,995 | 9/1981 | Moriya | 426/124 |
| 4,332,845 | 6/1972 | Nawata | 428/35 |
| 4,384,972 | 5/1983 | Nakamura et al. | 426/124 |

FOREIGN PATENT DOCUMENTS

| 3004325 | 8/1980 | Fed. Rep. of Germany | 426/124 |
| 54-103193 | 8/1979 | Japan . | |

Primary Examiner—John E. Kittle
Attorney, Agent, or Firm—Leydig, Voit, Osann, Mayer and Holt, Ltd.

[57] ABSTRACT

An oxygen absorbent package comprising a rectangular nonwoven fabric sheet, a rectangular perforated film or nonwoven fabric sheet having a lower softening point than sheet, a rectangular microporous film or nonwoven fabric sheet having a higher softening point than film or sheet, and an oxygen absorbent, the three layers being heat sealed on the four sides is disclosed. The oxygen absorbent package is mainly used for storage of foodstuff, particularly liquid or semiliquid foodstuff.

1 Claim, 2 Drawing Figures

OXYGEN ABSORBENT PACKAGING

BACKGROUND OF THE INVENTION

The present invention relates to an oxygen absorbent package using a microporous film or nonwoven fabric as at least part of material constituting the package.

Oxygen absorbents are widely used to keep oxygen out of the atmosphere in which foods and other products that do not like oxygen are stored. But if oxygen absorbents are used in connection with the storage of moist products and materials constituting the package packing oxygen absorbents are water permeable, the moisture enters the interior of the package of the absorbent and aqueous slurry of oxygen absorbent is formed. The aqueous slurry oozes out of the package and smears the foodstuffs.

Active research and development efforts have recently been made on thin plastic films such as microporous films and nonwoven sheets. Since these thin plastic films are as highly air-permeable as paper, they can be used as a material for packaging oxygen absorbents. However, this film is usually made of a single layer of polyolefin such as polyethylene and polypropylene, so it is difficult to heat-seal the microporous film by means of conventional packaging machines. The reason is that when two sheets of mono-layer films are adhered by melting inside portions of the mono-layer film, melted film is adhered to heat-seal bars or heat rolls of the machine. A special heat-sealer, such as an impulse heat-sealer is necessary in order to heat-seal mono-layer film. When such special heat sealer is used in automatic packaging machines in order to heat-seal the mono-layer film, it is impossible to operate the automatic packaging machine at a high speed. So, when the mono-layer film is heat-sealed by impulse heat-sealer, a decrease in efficiency is unavoidable. In addition, a microporous film is weakened. So a microporous film is not practical as a packaging material for packing an oxygen absorbent.

Oxygen absorbent packages using a plastic nonwoven sheet are disclosed in several prior art references. For example, Japanese Patent Publication (Kohkai) No. 2164/81 discloses a composite package including at least two layers, i.e. the plastic nonwoven sheet and an oxygen permeable but water-impermeable layer. But this package has the nonwoven sheet laminated or coated with a thermoplastic synthetic resin to reduce the inherent high gas permeability of the nonwoven sheet, so if the oxygen absorbent is put in the package, the desired oxygen removal rate is not obtained.

SUMMARY OF THE INVENTION

The present invention eliminates these defects.

An object of the present invention is to provide an oxygen absorbent package that retains the high gas permeability of plastic microporous films or nonwoven sheets and which yet can be processed by conventional packaging machines.

Another object of the present invention is to provide a waterproof oxygen absorbent package.

DETAILED DESCRIPTION OF THE INVENTION

Figure 1:
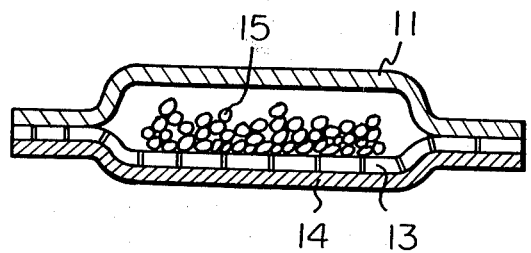
FIGS. 1 and 2 show an embodiment of the packages of this invention, and are a fragmentary sectional view of the packages.

In accordance with the invention, an oxygen absorbent package is provided comprising a rectangular nonwoven fabric sheet 11, a rectangular perforated film or nonwoven fabric sheet 13 have a lower softening point than sheet 11, a rectangular microporous film or nonwoven fabric sheet 14 having a higher softening point than film or sheet 13, and an oxygen absorbent 15, sheet 13 being disposed between sheet 11 and film or sheet 14, and oxygen absorbent 15 being disposed between 11 and 13, the three layers being heat sealed on the sides.

The nonwoven fabric sheets may be prepared by bonding fibers of plastics, such as polyethylene, polypropylene, polyfluoroethylene, polyester or polyamide by means of heat, pressure or adhesive. Nonwoven fabric sheets prepared by bonding long plastic fiber by means of heat or pressure. For example, suitable nonwoven fabric sheet is commercially available, and is sold under the names of TYVEK (E.I. Du Pont).

In general, the nonwoven fabric sheet has an air permeability of 0.01–10,000 sec/100 ml air, preferably 1–1,000 sec/100 ml air according to JIS P8117. The sheet is gas-permeable, but water-impermeable when there is no difference between pressure outside the bag and pressure in the bag.

When non-woven fabric sheets are used as outside materials 11 or 14 of the package, it is preferable that the nonwoven fabric sheets constituting the outside materials of the package have tensile strength above 10 Kg/15 mm; burst strength above 5 Kg/cm$^2$ and tear strength above 1 Kg. When nonwoven fabric sheets having such strengths are used as outside materials of the oxygen absorbent package, the package is not broken during handling of the package, or after the package has been packed with foodstuff.

However, it is unnecessary that the nonwoven fabric sheet which is used as an intermediate has such strengths and air permeability. Any of the commercially available nonwoven fabric sheets may be used as an intermediate layer.

The term "oxygen absorbent" in the specification and the claims means an agent for absorbing or removing oxygen present in the atmosphere of the container. Examples of the oxygen absorbents employed in the practice of this invention are disclosed in U.S. Pat. No. 4,113,652 by Yoshikawa et al patented on Sept. 12, 1978; U.S. Pat. No. 4,104,192 by Yoshikawa et al patented on Aug. 1, 1978; U.S. Ser. No. 816,135 by Ohtsuka et al filed on May 14, 1977; U.S. Pat. No. 4,127,503 patented on Nov. 28, 1978; U.S. Pat. No. 4,166,807 by Komatsu et al patented Sept. 4, 1977; and U.S. Pat. No. 4,192,773 by Yoshikawa et al patented Mar. 11, 1980, which are incorporated herein. Examples of the oxygen absorbents include reducing agent, such as iron powder, oxalates, sulfites, hydrogen sulfites, dithionites, pyrogallol, Rongalit, glucose, copper amine complex, zinc powder and the like, and any composition containing the reducing agent. A solid oxygen absorbent, a solid carrier impregnated with a liquid or semi-liquid oxygen absorbent, or a liquid or semi-liquid oxygen absorbent can be used as the oxygen absorbent of this invention. The solid oxygen absorbent and the solid carrier impregnated with the liquid or semi-liquid oxygen absorbent are preferred.

By the term "perforated film" is meant a plastic film through holes of 0.1–3 mm.

Films or nonwoven fabric sheets 13 having a lower softening point than sheet 11 include, for example, films or nonwoven fabric sheets made of polyethylene, polypropylene, ethylene-vinyl acetate copolymer and polyethylene ionomer and the like.

In general, the difference between a softening point of sheet 11 and that of film or sheet 13 may be above 5° C., preferably above 10° C. and most preferably above 20° C. So, materials constituting film or sheet 13 depends upon materials constituting sheet 11.

Similarly, the difference between a softening point of film or sheet 13 and that of film or sheet 14 may be above 5° C., preferably above 10° C. and most preferably above 20° C. Sheet 11 and film or sheet 14 may be made of the same or different material.

In general, thickness of film 14 may be in the range of 20–500μ, preferably 50–200μ, and thickness of laminate layer may be in the range of 20–200μ, and preferably 50–100μ.

Figure 2:
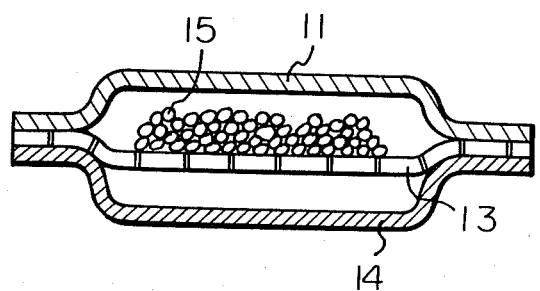

FIGS. 1 and 2 show an embodiment. The elements are: nonwoven fabric sheet 11, perforated film or nonwoven fabric sheet 13 having a lower softening point than film or sheet 11, microporous film or nonwoven fabric 14 having a higher softening point than film or sheet 13 and an oxygen absorbent 15. In FIG. 1, an intermediate perforated film is bonded to one on the outer layers. In FIG. 2, the intermediate film is not bonded to any one of the outer layers. The package of this embodiment may be prepared by putting an oxygen absorbent between 11 and 13, followed by heat-sealing the three layers on the sides.

According to the present invention, more effective oxygen absorption can be achieved by embossing the outer surface of 11 or 14 since air can flow between adjacent ridges even when the outer surface of 11 or 14 is put into close contact with the product to be stored.

The packages as explained above can be used for preserving foodstuffs. For example, when the package is packed with foodstuff in a package film so as to seal the package and the foodstuff, the oxygen absorbent contained in the package absorbs oxygen present in the package, whereby putrefaction or change in quality of the foodstuff can be prevented. The packages can be also used for preserving materials other than foodstuffs.

Since the film or sheet constituting outside material of the package is water impermeable, the bag can be packed with liquid or semi-liquid foodstuffs. In this case, the oxygen absorbent present in the package is completely prevented from contact with the liquid or semi-liquid foodstuffs of a container.

The packages of the present invention can be prepared at a high speed by using an ordinary heat seal machine.

This invention is now described in greater detail by reference to the following examples which are given here for illustrative purposes only and are by no means intended to limit the scope of the invention.

EXAMPLE 1

An ethylene-vinyl acetate copolymer film (40μ) having through holes of 0.2 mm, distance of which is 1 mm was laminated with a nonwoven sheet (TYVEK of Du Pont, U.S.A., 170μ thick). The resulting laminated film and a polyethylene nonwoven fabric sheet (TYVEK of Du Pont, U.S.A., 170μ thick) were loaded in a fast 4-side sealing/packing machine, in such a manner that the polyethylene film faced inward. As the laminated film and nonwoven sheet were heat-sealed with hot rolls, 3 g of oxygen absorbent (composition obtained by mixture 100 parts by weight of iron powder and 2 parts by weight of a 20 wt % NaCl aqueous solution and drying the mixture) was supplied at a rate of 80 shots/min to thereby provide oxygen absorbent packages (50 mm×50 mm, seal width: 5 mm). Each package was put in a laminated bag of polyvinylidene film and oriented polypropylene film together with cotton impregnated with 10 ml of water. The bag was filled with 500 ml of air and left at 25° C. Ten hours later, the oxygen concentration in the bag was reduced to 0.018%.

EXAMPLE 2

A polyethylene nonwoven fabric sheet (TYVEK of Du Pont, U.S.A., 170μ thick) and a polypropylene microporous film (Celgard of Celanese Corp., 50μ thick) having polyethylene ionomer film (40μ) having through holes of 0.3 mm, the distance of which is 7 mm were loaded in a fast 4-side sealing/packing machine. As the laminated film and nonwoven sheet were heat-sealed with hot rolls, 3 g of oxygen absorbent (composition obtained by mixture 100 parts by weight of iron powder and 2 parts by weight of a 20 wt % NaCl aqueous solution and drying the mixture) was supplied at a rate of 80 shots/min to thereby provide oxygen absorbent packages (50 mm×50 mm, seal width: 5 mm). Each package was put in a laminated bag of polyvinylidene film and oriented polypropylene film together with cotton impregnated with 10 ml of water. The bag was filled with 500 ml of air and left at 25° C. Ten hours later, the oxygen concentration in the bag was reduced to 0.025%.

EXAMPLE 3

An ethylene-vinyl acetate copolymer film (40μ thick) with 0.2 mm perforations 1 apart was in a grid pattern laminated with a sheet of nylon "Spun Bond" (product of Asahi Chemical Industry Co., Ltd.) 100μ thick. The laminated film and a polyethylene nonwoven sheet (TYVEK of Du Pont, U.S.A., 170μ thick) were loaded in a high-speed 4-side packing machine in such a manner that the ethylene-vinyl acetate copolymer film was in contact with the nonwoven sheet. As the laminated film and nonwoven sheet were heat-sealed with hot rolls, 3 g of an oxygen absorbent composition (a composition prepared by drying a mixture of 100 parts of iron powder and 2 parts of 20% aqueous NaCl) was supplied at a rate of 80 shots/min to make oxygen absorbent packages (50 mm×50 mm, seal width: 5 mm). Each package was put in a laminated bag of polyethylene film and oriented polypropylene film together with cotton impregnated with 10 ml of water. The bag was filled with 500 ml of air and left at 25° C. Ten hours later, the oxygen concentration in the bag was reduced to 0.018%.

EXAMPLE 4

Two polyethylene nonwoven sheets (TYVEK of Du Pont, U.S.A., 170μ thick) sandwiching a polyethylene ionomer film (40μ thick) with 0.3 mm perforations 7 mm apart in a grid pattern, were loaded in a high-speed 4-side packing machine. As the three films were heat-sealed with hot rolls, 3 g of an oxygen absorbent (a composition prepared by drying a mixture of 100 parts of iron powder and 2 parts of 20% aqueous NaCl) was put between the nonwoven sheet and one polyethylene ionomer film at a rate of 80 shots/min to thereby make oxygen absorbent packages (50 mm×50 mm, seal width: 5 mm). Each package was put in a laminated bag of polyethylene film and oriented polypropylene film together with cotton impregnated with 10 ml of water. The bag was filled with 500 ml of air and left at 25° C. Ten hours later, the oxygen concentration in the bag was reduced to 0.020%.

What is claimed is:

1. An oxygen absorbent package comprising first and second porous plastic outer layers, a single porous intermediate plastic layer and an oxygen absorbent disposed between one of said outer layers and said intermediate layer, said intermediate layer being gas permeable and having a lower softening point than the first and second outer layers and being in contact with and simultaneously heat sealed to said outer layers only around their peripheral edges, and said porous outer layers being gas permeable and water impermeable and consisting of a microporous film or nonwoven fabric sheet having a permeability between 0.01 and 10,000 sec. per 100 ml of air.

* * * * *